United States Patent
Prohofsky

(10) Patent No.: US 7,907,546 B1
(45) Date of Patent: Mar. 15, 2011

(54) METHOD AND SYSTEM FOR PORT NEGOTIATION

(75) Inventor: Thomas R. Prohofsky, Edina, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 0 days.

(21) Appl. No.: 12/411,176

(22) Filed: Mar. 25, 2009

Related U.S. Application Data

(60) Provisional application No. 61/114,336, filed on Nov. 13, 2008.

(51) Int. Cl.
*H04L 12/28* (2006.01)

(52) U.S. Cl. ......... 370/254; 370/351; 370/359; 370/360; 370/413; 709/233

(58) Field of Classification Search .................. 370/254, 370/351, 359, 360, 412, 413, 428; 709/233
See application file for complete search history.

(56) References Cited

U.S. PATENT DOCUMENTS

| | | | | |
|---|---|---|---|---|
| 7,436,845 B1* | 10/2008 | Rygh et al. | ..................... | 370/413 |
| 7,447,198 B1* | 11/2008 | Banks et al. | .................. | 370/386 |
| 7,639,616 B1* | 12/2009 | Manula et al. | ................ | 370/235 |
| 7,698,408 B1* | 4/2010 | Johnsen et al. | ............... | 709/223 |
| 7,724,678 B1* | 5/2010 | Johnsen et al. | ............... | 370/248 |
| 2002/0059469 A1* | 5/2002 | Gray et al. | ..................... | 709/310 |
| 2003/0120852 A1* | 6/2003 | McConnell et al. | .......... | 710/316 |
| 2005/0271073 A1* | 12/2005 | Johnsen et al. | ............... | 370/428 |
| 2006/0002385 A1* | 1/2006 | Johnsen et al. | ............... | 370/389 |
| 2006/0045098 A1* | 3/2006 | Krause | .......................... | 370/396 |
| 2006/0059269 A1* | 3/2006 | Chen et al. | .................... | 709/235 |
| 2007/0038793 A1* | 2/2007 | Wehage et al. | ............... | 710/305 |
| 2009/0193164 A1* | 7/2009 | Ajanovic et al. | .............. | 710/107 |

\* cited by examiner

*Primary Examiner* — Salman Ahmed
*Assistant Examiner* — Andrew C Lee
(74) *Attorney, Agent, or Firm* — Klein, O'Neill & Singh, LLP

(57) ABSTRACT

Method and system for network communication between a first network port and at least a second network port is provided. The method includes establishing bi-directional communication between the first network port and the second network port using a first set of port setting information. After establishing bi-directional communication, a second set of port setting information is sent from the first network port to the second network port. If a response to the second set of port setting information is not received from the second network port within a given duration or if an unacceptable response is received from the second network port, then the first set of port setting information is used for communication between the first and second network ports.

7 Claims, 4 Drawing Sheets

METHOD AND SYSTEM FOR PORT NEGOTIATION

CROSS REFERENCE TO RELATED APPLICATION

This application claims the benefit and priority of U.S. Provisional Application Ser. No. 61/114,336, entitled METHOD AND SYSTEM FOR PORT NEGOTIATION, filed Nov. 13, 2008, which is herein incorporated by reference in its entirety for all purposes.

BACKGROUND

1. Technical Field

The present disclosure relates to networks.

2. Related Art

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

Network ports are commonly used for network communication. Network ports may be located in various devices, for example, a network switch and others. Network ports may communicate with each other via high-speed links (for example, 10 gigabits per second (10G) links).

High-speed serial communication typically uses transmitter signal manipulation to optimize signal quality over a variety interconnections. Often these parameters are statically set or a data protocol includes an initialization sequence to select and set appropriate values. For various reasons these parameters may be optimized during normal operation after an initial connection, or after a link has been established. If changes to these parameters are made incorrectly a network link may fail and may need an inefficient lengthy initialization process. Continuous efforts are being made to reduce inefficiencies in network communication.

SUMMARY

In one embodiment, a method for network communication between a first network port and at least a second network port is provided. The method includes establishing bi-directional communication between the first network port and the second network port using a first set of port setting information. After establishing bi-directional communication, a second set of port setting information is sent from the first network port to the second network port.

If a response to the second set of port setting information is not received from the second network port within a given duration or if an unacceptable response is received from the second network port, then the first set of port setting information is used for communication between the first and second network ports.

If an acceptable response is received from the second network port, then the second set of port setting information is used for communication between the first network port and the second network port.

In another embodiment, if the first network port and the second network port are in a link recovery state, after the first port sends the second set of port setting information, then the first set of port setting information is used for communication between the first network port and the second network port.

In yet another embodiment, a communication system is provided. The communication system includes a first network port configured to communicate with at least a second network port via a network link. Bi-directional communication is established between the first network port and the second network port using a first set of port setting information.

After establishing bi-directional communication, the first network port is configured to send a second set of port setting information to the second network port. If a response to the second set of port setting information is not received from the second network port within a given duration or if an unacceptable response is received from the second network port, then the first set of port setting information is used for bi-directional communication between first network port and the second network port.

If an acceptable response is received from the second network port, then the second set of port setting information is used for communication between the network ports.

This brief summary has been provided so that the nature of the disclosure may be understood quickly. A more complete understanding of the disclosure can be obtained by reference to the following detailed description concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1A:
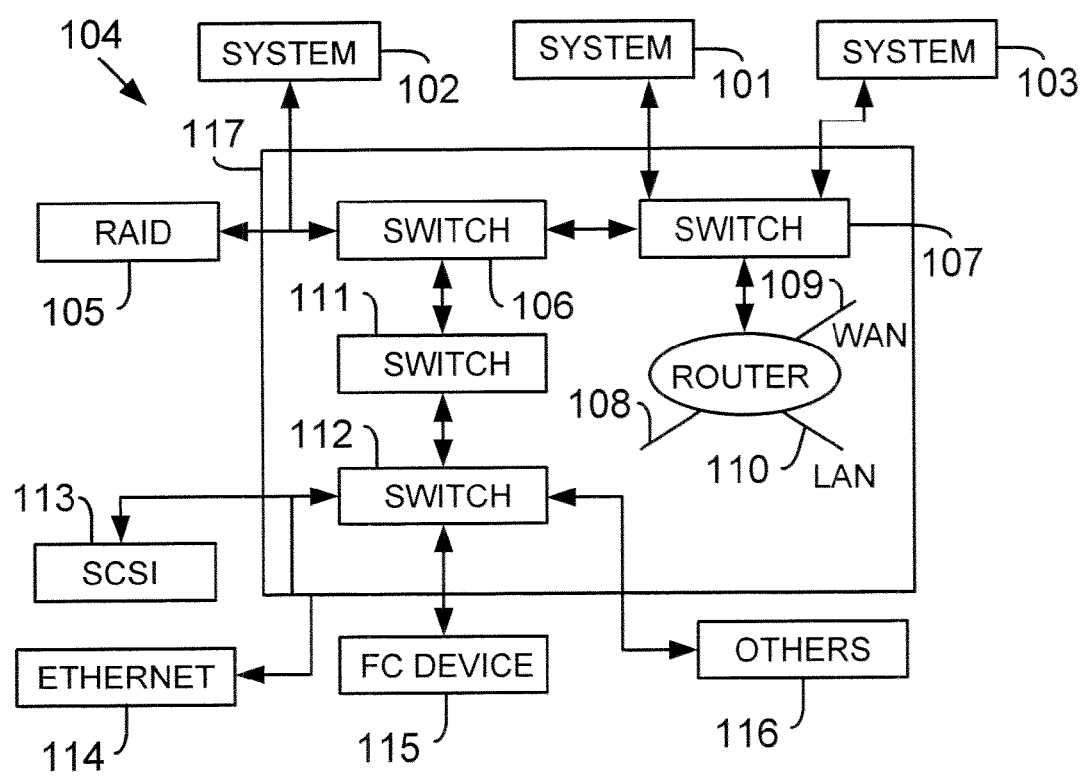
FIG. 1A shows a block diagram of a network system, according to one embodiment.

In one embodiment, a transmitter (i.e. a network port that is transmitting information) time t0, sends new transmitter port setting to a receiving port. If the receiving port sends a confirmation, then the transmitter uses the new port settings that were sent at time, t0. If the receiving port does not send a confirmation, then the transmitter uses settings prior to time t0, which the receiving port had confirmed. This avoids error conditions and lengthy training sequences.

DEFINITIONS

The following definitions are provided for convenience as they are typically (but not exclusively) used in the networking environment, implementing the various adaptive aspects described herein.

"Port": A structure, physical or logical that operates within a network. A port typically includes a receive segment to receive information and transmit segment for transmitting information. A port that transmits information may be referred to as a "transmitter" and a port that receives information may be referred to as "receiving port".

"Inter switch link" or "ISL": A physical link that is used for connecting two or more switches. Network ports use ISLs to communicate with each other.

"Packet": A group of one or more network data word(s) used for network communication.

"Switch": A device that facilities network communication.

Any of the embodiments described with reference to the figures may be implemented using firmware, hardware (e.g., fixed logic circuitry), manual processing, or a combination of these implementations. The term "logic" "module," "component," "system" or "functionality" as may be used herein generally represents software, firmware, hardware, or a combination of these elements. For instance, in the case of a software implementation, the term "logic," "module," "component," "system," or "functionality" represents program code that performs specified tasks when executed on a processing device or devices (e.g., processors). The program code can be stored in one or more processor readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over plural locations.

The terms "machine-readable media" or the like when used, refer to any kind of medium for retaining information in any form, including various kinds of storage devices (magnetic, optical, static, and the like). The term machine-readable media also encompasses transitory forms for representing information, including various hardwired and wireless links for transmitting the information from one point to another.

The embodiments disclosed herein, may be implemented as a processor executable process (a method), a computing system, or as an article of manufacture, such as a computer program product or computer readable media. The computer program product may be a computer storage media readable by a computer device and encoding a computer program of instructions for executing a computer process. The computer program product may also be a propagated signal on a carrier readable by a computing system and encoding a computer program of instructions for executing a computer process.

To facilitate an understanding of the various embodiments, the general architecture and operation of a network system with respect to the InfiniBand standard (also referred to as "IB") will be described. The specific architecture and operation of the various embodiments will then be described with reference the general architecture of the network system.

IB is a switched fabric interconnect standard for servers, incorporated herein by reference in its entirety. IB technology is deployed for server clusters/enterprise data centers ranging from two to thousands of nodes. The IB standard is published by the InfiniBand Trade Association, and is incorporated herein by reference in its entirety.

An IB switch is typically a multi-port device. Physical links (optical or copper) connect each port in a switch to another IB switch or an end device (for example, Target Channel Adapter (TCA) or a Host Channel Adapter (HCA)).

Network System: FIG. 1A shows a block diagram of a generic network system 104 with various devices, used according to one embodiment. System 104 includes a fabric 117, which includes a plurality of switches 106, 107, 111 and 112 for moving network packets. Fabric 117 may also include a router 108 that is coupled to a wide area network 109 and local area network 110.

Switch 106, for example, may be operationally coupled to a RAID storage system 105 and system 102, while system 101 and 103 may be operationally coupled to switch 107.

Switch 112 may be coupled to a small computer system interface ("SCSI") SCSI port 113 that is coupled SCSI based devices. Switch 112 may also be coupled to an Ethernet port 114, Fibre Channel device(s) 115 and other device(s) 116.

Systems 101-103 typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Figure 1B:
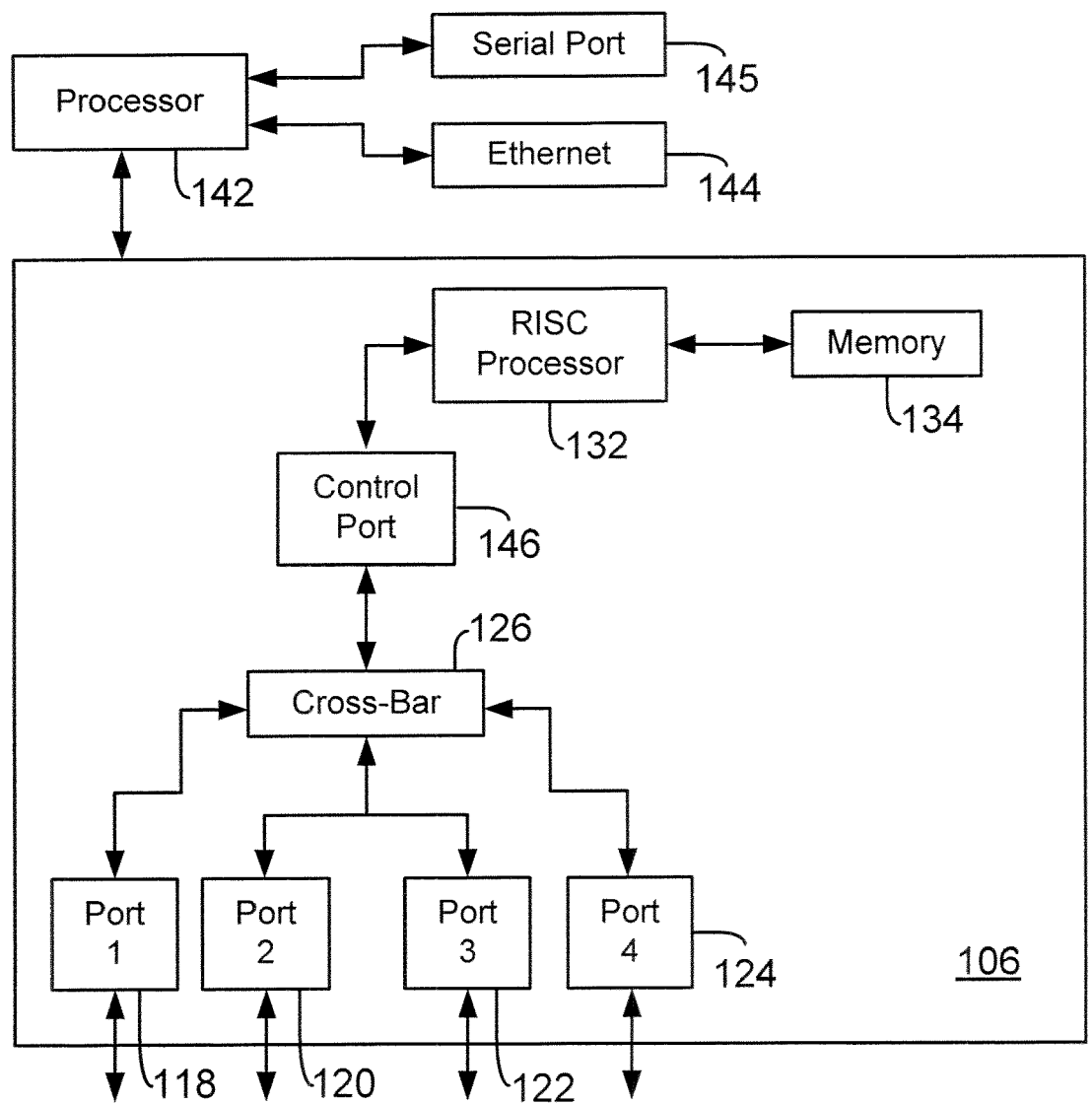
FIG. 1B shows a block diagram of a switch using the system, according to one embodiment.

FIG. 1B shows a block diagram of switch 106 that includes a processor 132, which is operationally coupled to a plurality of ports 118, 120, 122 and 124 via a control port 146 and crossbar 126. In one embodiment, processor 132 may be a reduced instruction set computer (RISC) type microprocessor. Processor 132 executes firmware instructions out of memory 134 to control the overall operations of switch 106. Crossbar 126 is used to move information among ports 118-124. Control port 146 is used to send control information to each port.

Switch 106 may be coupled to an external processor 142 that is coupled to an Ethernet port 144 and serial port 145. In one embodiment, processor 142 may be a part of computing system 106. A network administrator may use processor 142 to configure switch 106.

Figure 2A:
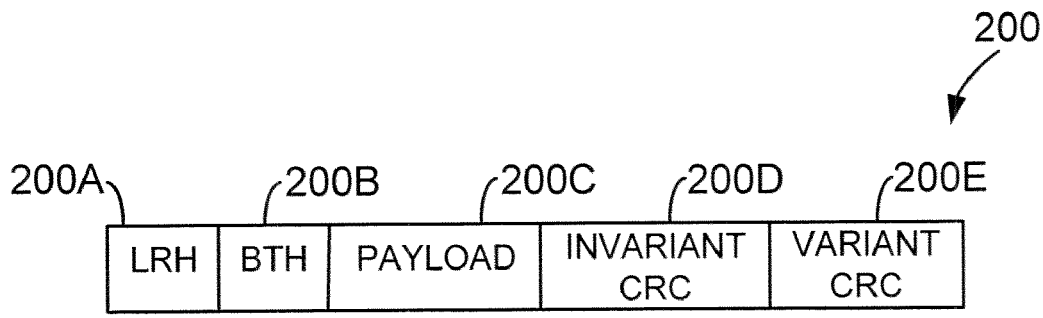
FIGS. 2A and 2B shows an IB packet structure, used according to one embodiment.

Packet Structure: FIG. 2A provides an example of a packet structure that may be used in the various embodiments described herein. In one embodiment, packet 200 includes a local route leader (LRH) 200A, a base transport header (BTH) 200B, packet payload 200C, invariant cyclic redundancy code (CRC) 200D, and variant CRC 200E. Packet structure 200 is also described in Infiniband Architecture Specification, Volume 1, Chapter 6, titled "Data Packet Format", incorporated herein by reference in its entirety.

Figure 2B:
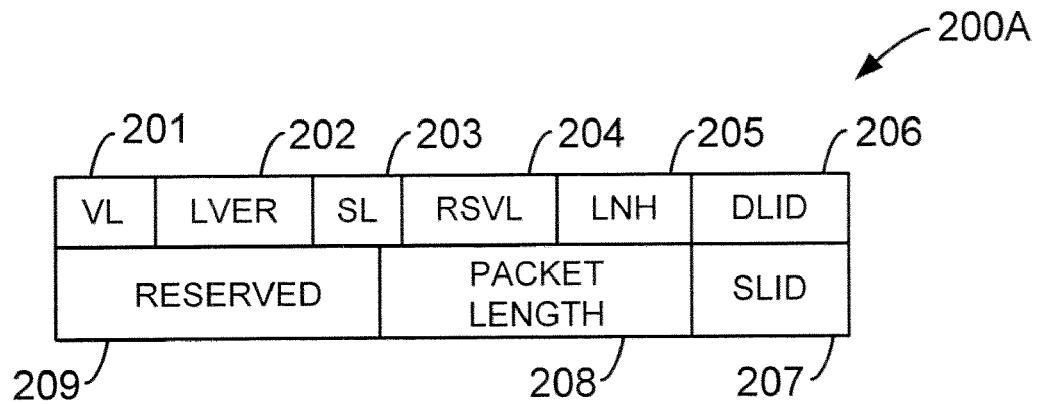

FIG. 2B shows a block diagram of local route header (LRH) 200A, where the local route header contains the fields for local routing by switches within an InfiniBand subnet. LRH in InfiniBand (Subnet routing) is analogous to FC-2 in Fibre Channel and MAC layer (LAN routing) in Ethernet.

LRH 200A includes a VL field 201 that identifies which receive buffer and flow control credits should be used for processing a received packet, link version (Lver) field 202 specifies the version of the LRH packet 200A, service level (SL) field 203 is used by switch 112 to determine a transmit VL for a packet, and link next header (LNH) field 205 specifies what header follow the LRH 200A. Field 209 is a reserved field.

LRH 200A also includes a destination local identifier (DLID) field 206 that specifies the port to which switch 112 delivers the packet and source identifier (SLID) field 207 that indicates the source of the packet. Packet length field 208 specifies the number of words contained in a packet. Field 204 is reserved.

Figure 3:
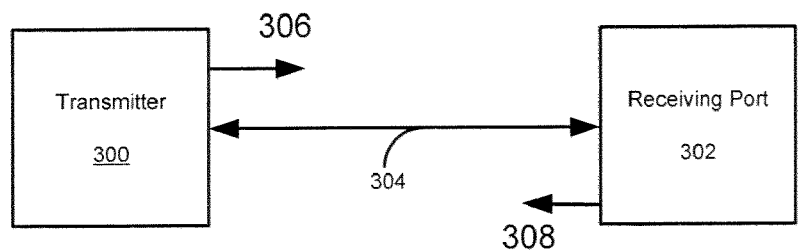
FIG. 3 shows an example of a transmitter communicating with a receiving port, according to one embodiment.

FIG. 3 shows a block diagram of a switch with two ports 300 (transmitter port) and 302 (receiving port) operationally coupled over link 304. Before transmitter 300 can send and receive packets, the ports are initialized and share their settings. Transmitter 300 sends its setting 306 (also referred to as first set of port setting information) over link 304 to receiving port 302. Receiving port 302 then sends an acknowledgement 308 back to transmitter 300.

At any given time, after the ports 300 and 302 are initialized and have shared their settings, transmitter 300 may change its settings. Transmitter 300 sends the new settings (also referred to as second set of port setting information) to port 302. If port 302 does not respond back, within a certain time, the transmitter 300 reverts back to its previous settings that were acknowledged by port 302. This avoids going through a new training sequence to establish new port setting information.

In one embodiment, transmitter 300 and receiving port 302 may operate in an InfiniBand or non-InfiniBand environment (for example, Fibre Channel, Fibre Channel over Ethernet and others).

Figure 4:
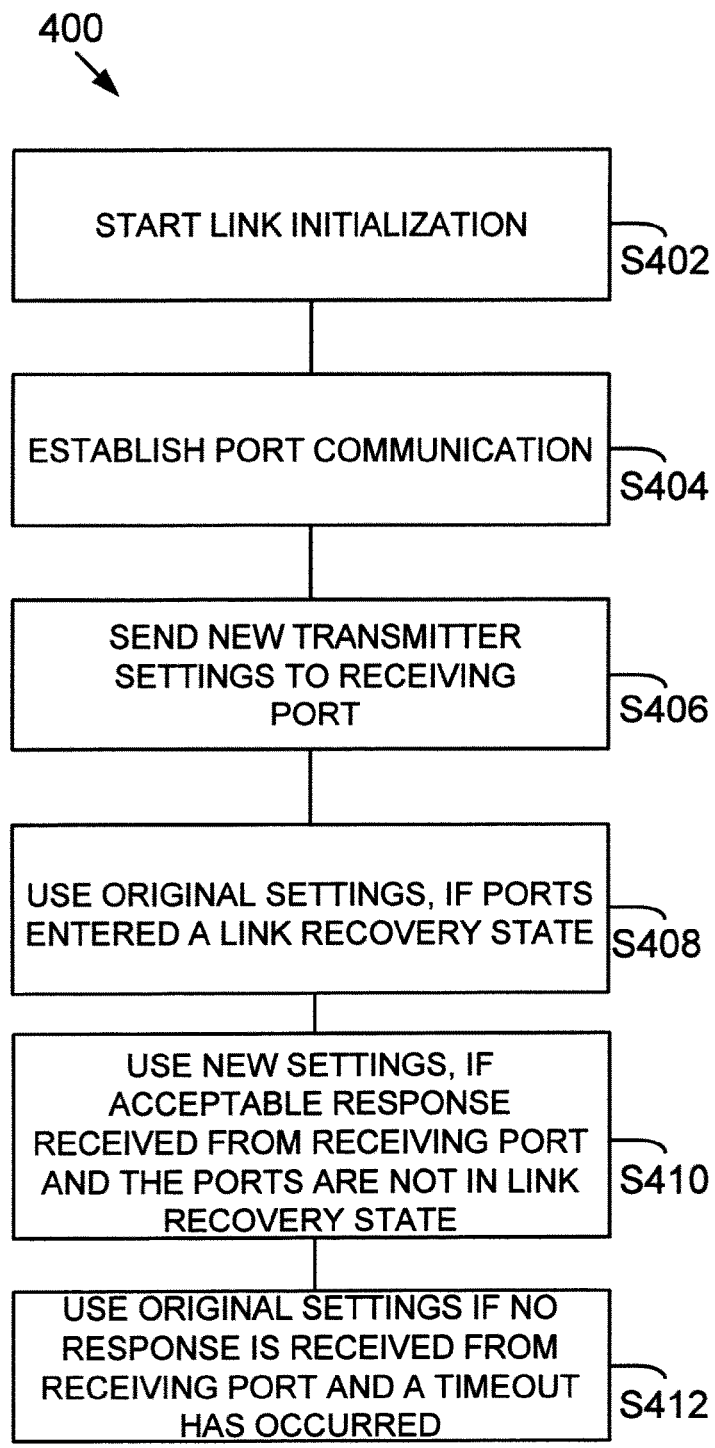
FIG. 4 shows a process flow diagram according to one embodiment.

FIG. 4 shows a process flow diagram, according to one embodiment. The process begins in block S400, when link 304 initialization begins. Typically, the protocol used by the ports (for example, IB) specifies the link initialization process. During link initialization, ports 300 and 302 exchange parameters including port settings. The IB standard establishes the link training protocol and sequence.

In block S404, bi-directional communication is established between the ports (for example, 300 and 302, FIG. 3).

In block S406, transmitter 300 (may also be referred to as "first port") may send new transmitter settings (i.e. second set of port settings) to receiving port 302 (may also be referred to as a "second port").

In block S408, if the ports have entered a link recovery state, then original settings from block S402 are used. A link recovery state is a state where two ports have negotiated resetting a link.

In block S410, if link recovery state is not entered in block S408, and confirmation is received from receiving port 302, then the new settings sent in block S406 are set and used.

In block S412, original port settings are used, if an unacceptable response is received from receiving port 302 and/or a timeout has occurred. The timeout may be programmed by switch firmware to establish a boundary beyond which transmitter port 300 does not have to wait to get a response from receiving port 302.

Although the present disclosure has been described with reference to specific embodiments, these embodiments are illustrative only and not limiting. Many other applications and embodiments of the present invention will be apparent in light of this disclosure, and the following claims.

What is claimed is:

1. A method for network communication between a first network port and at least a second network port, comprising:
   (a) establishing bi-directional communication between the first network port and the second network port using a first set of port setting information;
   (b) after establishing bi-directional communication, sending a second set of port setting information from the first network port to the second network port;
   (c) if a response to the second set of port setting information is not received from the second network port within a given duration or if an unacceptable response is received from the second network port, using the first set of port setting information for communication between the first and second network ports;
   (d) if an acceptable response is received from the second network port, using the second set of port setting information for communication between the first network port and the second network port; and
   (e) if the first network port and the second network port are in a link recovery state, after the first port sends the second set of port setting information, then the first set of port setting information is used for communication between the first network port and the second network port.

2. The method of claim 1, wherein the first network port and the second network port communicate via a network link.

3. The method of claim 1, wherein the first network port and the second network port operate in an InfiniBand environment.

4. The method of claim 1, wherein the first network port and the second network port operate in a non-InfiniBand environment.

5. A communication system, comprising: a first network port configured to communicate with at least a second network port via a network link; wherein bi-directional communication is established between the first network port and the second network port using a first set of port setting information; wherein, after establishing bi-directional communication, the first network port is configured to send a second set of port setting information to the second network port; and if a response to the second set of port setting information is not received from the second network port within a given duration or if an unacceptable response is received from the second network port, then the first set of port setting information is used for bi-directional communication between the first network port and the second network port; wherein if an acceptable response is received from the second network port, then the second set of port setting information is used for communication between the network ports, and wherein if the first network port and the second network port are in a link recovery state, after the first network port sends the second set of port setting information, then the first set of port setting information is used for communication between the first network port and the second network port.

6. The system of claim 5, wherein the first network port and the second network port operate in an InfiniBand environment.

7. The system of claim 5, wherein the first network port and the second network port operate in a non-InfiniBand environment.

* * * * *